(12) United States Patent
Courtemanche et al.

(10) Patent No.: US 9,101,861 B2
(45) Date of Patent: Aug. 11, 2015

(54) LIQUID SEPARATING DRUM, SEPARATOR PROVIDED WITH SUCH A DRUM, AND KIT FOR ASSEMBLING THE SAME

(75) Inventors: Alain Courtemanche, Lefebvre (CA); Yann Desrochers, St-Nicephore (CA); Stephane St-Onge, St-Nicephore (CA)

(73) Assignee: GEA HOULE INC., Quebec (CA)

( * ) Notice: Subject to any disclaimer, the term of this patent is extended or adjusted under 35 U.S.C. 154(b) by 789 days.

(21) Appl. No.: 13/496,133

(22) PCT Filed: Sep. 14, 2010

(86) PCT No.: PCT/CA2010/001457
§ 371 (c)(1),
(2), (4) Date: Jun. 26, 2012

(87) PCT Pub. No.: WO2011/029205
PCT Pub. Date: Mar. 17, 2011

(65) Prior Publication Data
US 2012/0255896 A1     Oct. 11, 2012

(30) Foreign Application Priority Data

Sep. 14, 2009 (CA) ..................................... 2678839

(51) Int. Cl.
| | | |
|---|---|---|
| B01D 33/11 | (2006.01) | |
| B01D 33/13 | (2006.01) | |
| B01D 33/067 | (2006.01) | |
| B01D 33/00 | (2006.01) | |
| B01D 33/76 | (2006.01) | |
| B01D 29/44 | (2006.01) | |

(52) U.S. Cl.
CPC ............ *B01D 33/067* (2013.01); *B01D 29/445* (2013.01); *B01D 33/0019* (2013.01); *B01D 33/11* (2013.01); *B01D 33/76* (2013.01)

(58) Field of Classification Search
None
See application file for complete search history.

(56) References Cited

U.S. PATENT DOCUMENTS

| 3,750,884 A | 8/1973 | Satake |
| 4,193,503 A * | 3/1980 | Connolly ....................... 209/393 |
| 4,236,999 A * | 12/1980 | Burgess et al. ............... 209/240 |

(Continued)

FOREIGN PATENT DOCUMENTS

| CA | 2142877 | 3/1994 |
| CA | 2301859 | 3/1999 |

*Primary Examiner* — Thomas M Lithgow
(74) *Attorney, Agent, or Firm* — Kramer Levin Naftalis & Frankel LLP

(57) ABSTRACT

A liquid separating drum (1) for use with a separator (3) in order to separate liquid material (11a) from solid material (11b) in a mixture material (11) to be processed. The liquid separating drum (1) includes an elongated main body (5) having a longitudinal axis (7), the main body (5) being removably mountable about a base frame (9) of the separator (3) so as to be rotatable with respect thereto, the main body (5) having an inlet (5a) for receiving the mixture material (11) to be processed, and an outlet (5b) for releasing processed material. Advantageously, the main body (5) includes a plurality of longitudinal slits (15) operatively connecting the interior (17) of the main body (5) to the exterior (19) thereof, the longitudinal slits (15) extending longitudinally with respect to the main body (5) and being provided circumferentially about said main body (5), each longitudinal slit (15) being profiled and defining an interface (21) configured for allowing liquid material (11a) to evacuate out from the interior (17) of the main body (5) via the interface (21) in a diverging manner through the slit (15), while retaining solid material (11b) inside the main body (5).

23 Claims, 20 Drawing Sheets

(56) References Cited

U.S. PATENT DOCUMENTS

| | | |
|---|---|---|
| 4,267,035 A | 5/1981 | Martin |
| 4,278,543 A * | 7/1981 | Maniquis ............... 210/403 |
| 4,303,508 A | 12/1981 | Skretting |
| 4,426,921 A | 1/1984 | Meinardus |
| 4,535,895 A | 8/1985 | Takiguchi et al. |
| 5,011,065 A | 4/1991 | Musselmann |
| 5,429,248 A | 7/1995 | Le Gigan et al. |
| 5,472,095 A * | 12/1995 | Malm ..................... 209/303 |
| 5,524,769 A | 6/1996 | Spencer |
| 5,618,424 A | 4/1997 | Nagaoka |
| 5,622,625 A | 4/1997 | Nagaoka |
| 5,967,335 A | 10/1999 | Clarstrom et al. |
| 6,702,120 B1 | 3/2004 | Forslund et al. |
| 6,892,516 B1 | 5/2005 | Ardagna |
| 6,938,846 B1 | 9/2005 | Kristrom et al. |
| 2006/0273048 A1 | 12/2006 | Doyle et al. |
| 2007/0235394 A1 | 10/2007 | Dendel |
| 2010/0012573 A1 | 1/2010 | Dendel et al. |

\* cited by examiner

US 9,101,861 B2

LIQUID SEPARATING DRUM, SEPARATOR PROVIDED WITH SUCH A DRUM, AND KIT FOR ASSEMBLING THE SAME

CROSS REFERENCE TO RELATED APPLICATIONS

This application is the United States national phase filing of the corresponding international application number PCT/CA2010/001457, filed on Sep. 14, 2010, which claims priority to and benefit of Canadian Application No. 2,678,839, filed Sep. 14, 2009, both of these applications are hereby incorporated by reference in their entirety.

FIELD OF THE INVENTION

The present invention relates to a liquid separating drum. More particularly, the present invention relates to a liquid separating drum for use with a separator in order to separate liquid material from solid material in a mixture material to be processed, and also relates to a separator provided with such a drum, as well as to a kit for assembling the same, and to corresponding methods of operation and/or of assembly associated thereto.

BACKGROUND OF THE INVENTION

Separators, such as manure separators for example, and the rotating horizontal drums used therewith, are well known in the art.

Indeed, examples of conventional separators with rotatable horizontal drums are illustrated in FIGS. 1-3 (product commercialized by ACCENT™), in FIG. 4 (product commercialized by DARITECH™), and in FIGS. 5-9 (products commercialized by VINCENT CORPORATION™).

Also known to the Applicant are the following U.S. patent and patent applications which describe various other types of separating mechanisms and/or the like: U.S. Pat. Nos. 3,750,884; 4,267,035; 4,303,508; 4,426,921; 4,535,895; 5,429,248; 5,524,769; 5,618,424; 5,622,625; 5,967,335; 6,702,120 B1; 6,892,516 B1; 6,938,846 B1; 2006/0273048 A1; 2007/0235394 A1; and 2010/0012573 A1.

It is also known in the art that the main difficulty during the processing or "dewatering" of material, such as manure for example, is not necessarily the separation of the liquid material from the solid material thereof, as such, but rather the difficulty of operating a given liquid separating device in a manner so as to obtain constant and efficient results.

Separator systems with "rolling drums" configurations are also well known, and are relatively common in the field of solid/liquid separation. However, a main problem associated with such a configuration is that these systems are relatively poor in terms of performance since the material to be processed is not under pressure. Thus, a very large-sized cylinder is required to compensate, which in turn takes up a very large amount of space. However, such an increased length and increased diameter of a large-sized cylinder obviously lead to other substantial drawbacks and inconveniences.

It is also known that most conventional rotary screen separators which are intended to separate liquid material from solid material in a mixture material to be processed, generally consist of a rotating liquid separating drum which is simply perforated, that is, provided simply with a series of small circular holes about the peripheral surface of the drum, extending in a straightforward manner between the interior of the drum and the exterior thereof, for allowing liquid material to be evacuated through said small simple circular holes. However, such a configuration is not optimal in that, among other disadvantages, such small simple circular holes tend to become plugged up by the mixture material inside the drum to be processed.

Hence, in light of the above-discussed, there is a need for an improved liquid separating drum and/or corresponding separator provided with the same, which by virtue of its design and components, would be able to overcome or at the very least minimize some of the above-mentioned prior art problems and drawbacks.

SUMMARY OF THE INVENTION

An object of the present invention is to provide a liquid separating device which satisfies some of the above-mentioned needs, and which is thus an improvement over other related devices and/or corresponding liquid separating methods known in the prior art.

In accordance with the present invention, the above object is achieved, as will be easily understood, with a liquid separating drum such as the one briefly described herein and such as the one exemplified in the accompanying drawings.

More particularly, according to the present invention, there is provided a liquid separating drum for use with a manure separator in order to separate liquid material from solid material in a mixture material of manure to be processed, the liquid separating drum comprising:

an elongated main body having a longitudinal axis, the main body being removably mountable about a base frame of the manure separator so as to be rotatable with respect thereto, the main body having an inlet for receiving the mixture material of manure to be processed, and an outlet for releasing processed manure material, the main body comprises a plurality of longitudinal slits operatively connecting the interior of the main body to the exterior thereof, the longitudinal slits extending longitudinally with respect to the main body and being provided circumferentially about said main body, each longitudinal slit being profiled and defining an interface configured for allowing liquid material to evacuate out from the interior of the main body via the interface in a diverging manner through the slit, while retaining solid material inside the main body;

a plurality of supporting ribs disposed along the longitudinal axis of the main body and extending transversally with respect to said longitudinal axis; and a plurality of profiled bars mounted circumferentially onto the supporting ribs and extending longitudinally with respect to the main body so as to define complementary profiled longitudinal slits, each slit being configured for allowing liquid material of the manure to be processed to evacuate out from the main body through said slit, while retaining solid material of the manure to be processed inside the main body, each profiled bar comprising a central axis, and each profiled bar being mounted onto supporting ribs so that its central axis is disposed at a given angle ranging with respect to a corresponding radial axis of the liquid separating drum, the given angle ranging between about 2 degrees and about 4 degrees so as to provide the main body with an inner peripheral contact surface that is serrated, and the main body of the drum being configured for mounting at a positive inclination with respect to a longitudinal axis of the base frame, so that the outlet of the main body be located higher than the inlet thereof.

According to another aspect of the present invention, there is also provided a separator provided with the above-mentioned liquid separating drum. More particularly, and according to a given preferred embodiment of the present invention, the mixture material to be processed is a manure-type material, and thus, the separator is preferably a manure separator.

According to another aspect of the present invention, there is also provided a processing plant provided with the above-mentioned separator. The processing plant can be a farm, a factory, or any other type of establishment requiring the use of the present liquid separating drum.

According to another aspect of the present invention, there is provided a method of operating the above-mentioned liquid separating drum, separator and/or plant.

According to another aspect of the present invention, there is also provided a kit with corresponding components for assembling the above-mentioned liquid separating drum, separator and/or plant.

According to another aspect of the present invention, there is also provided a set of components for interchanging with certain components of the above-mentioned kit.

According to another aspect of the present invention, there is also provided a method of assembling components of the above-mentioned kit and/or set.

According to another aspect of the present invention, there is also provided a method of manufacturing one or several of the above-mentioned components, including the liquid separating drum itself.

The objects and advantages of the present invention will become more apparent upon reading of the following non-restrictive description of preferred embodiments thereof, given for the purpose of exemplification only, with reference to the accompanying drawings.

Figure 1:
FIG. 1 is a perspective view of a liquid separating device according to the prior art.
Figure 2:
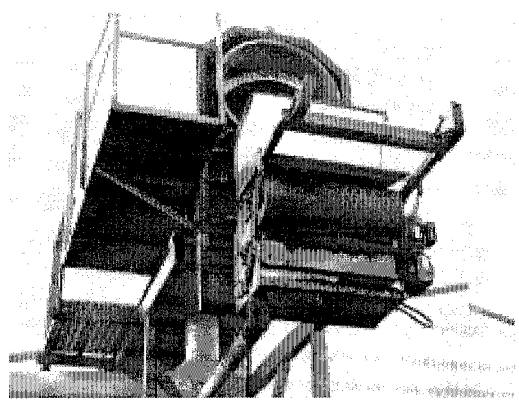
FIG. 2 is a bottom perspective view of a portion of what is shown in FIG. 1.
Figure 3:
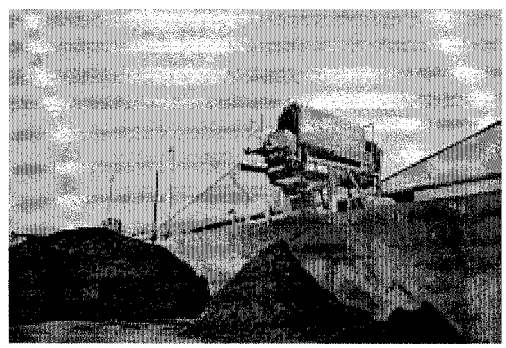
FIG. 3 is another perspective view of what is shown in FIG. 1.
Figure 4:
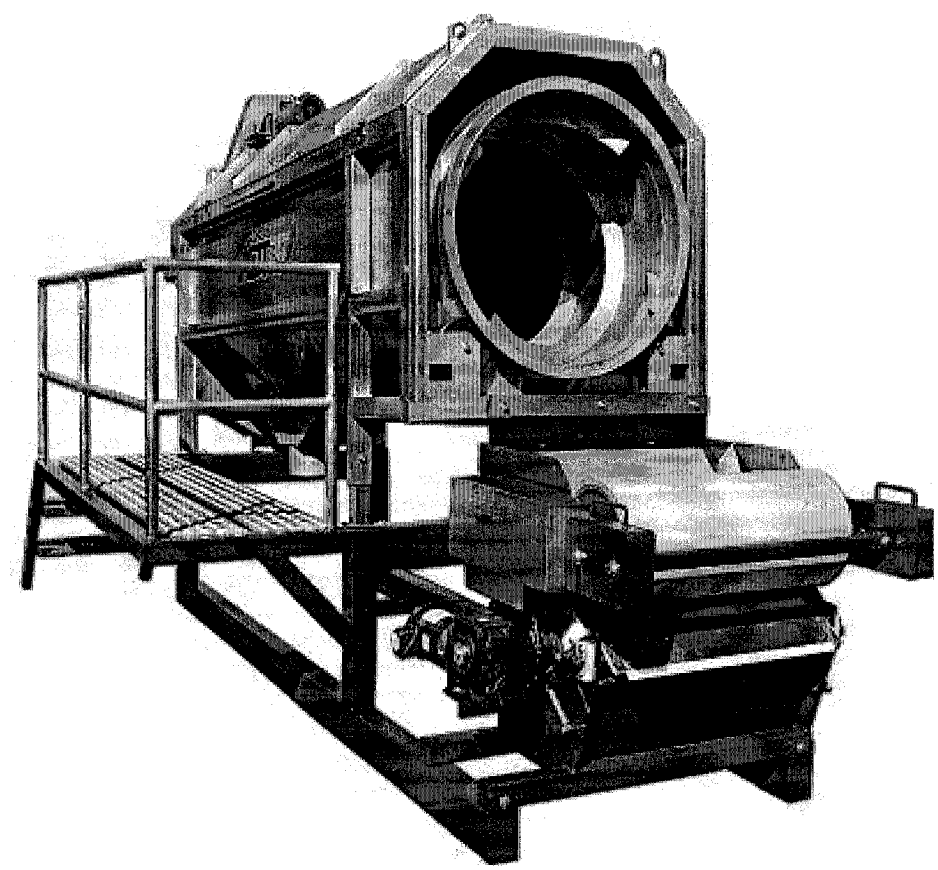
FIG. 4 is a perspective view of another liquid separating device according to the prior art.
Figure 5:
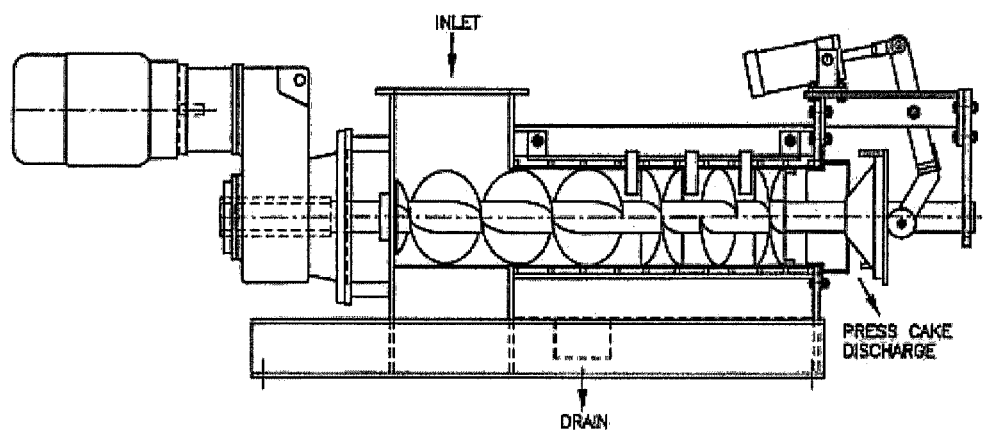
FIG. 5 is a schematic longitudinal cross-sectional view of another liquid separating device according to the prior art.
Figure 6:
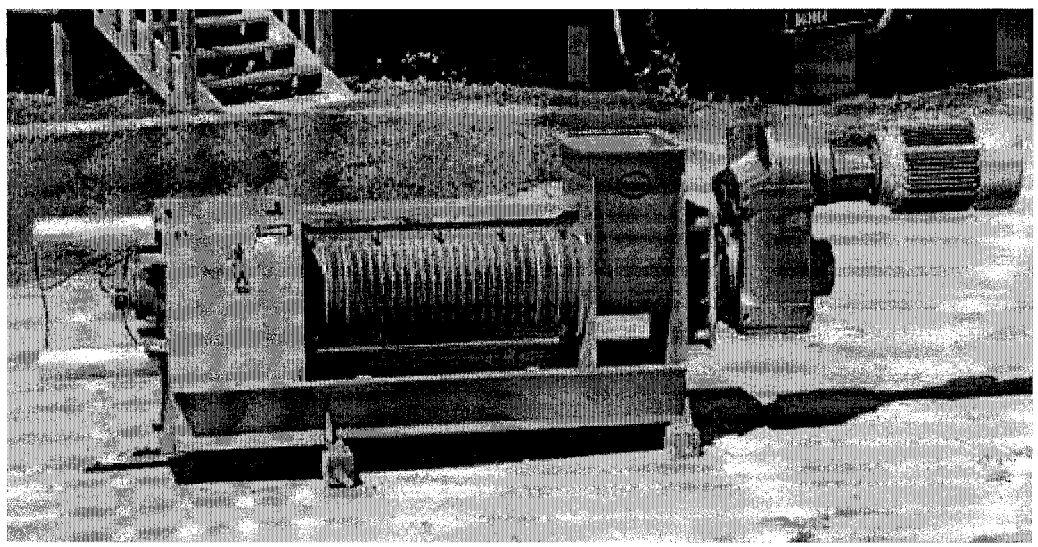
FIG. 6 is a perspective view of another liquid separating device according to the prior art.
Figure 7:
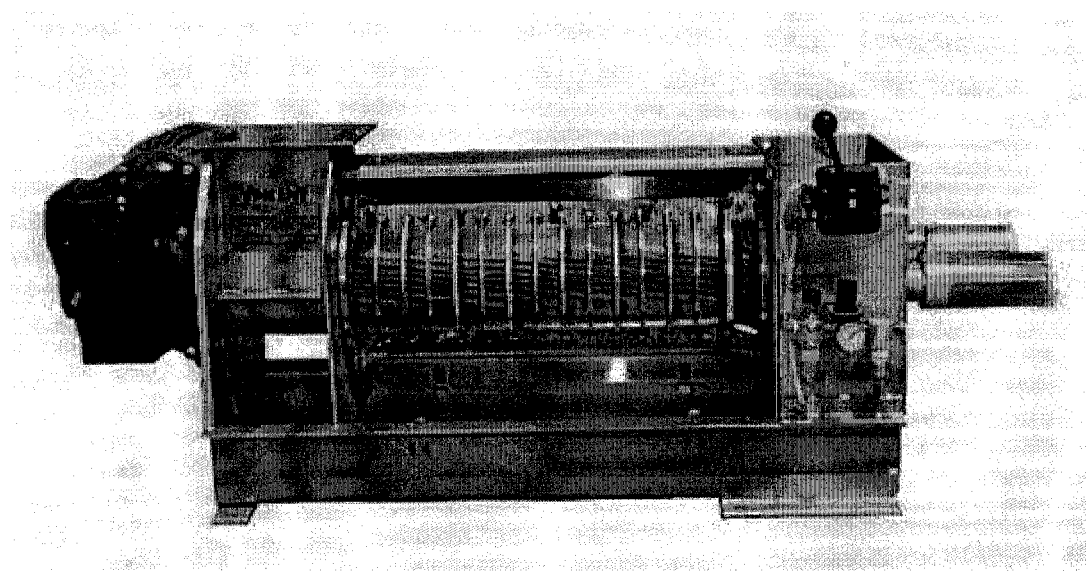
FIG. 7 is a side perspective view of another liquid separating device according to the prior art.
Figure 8:
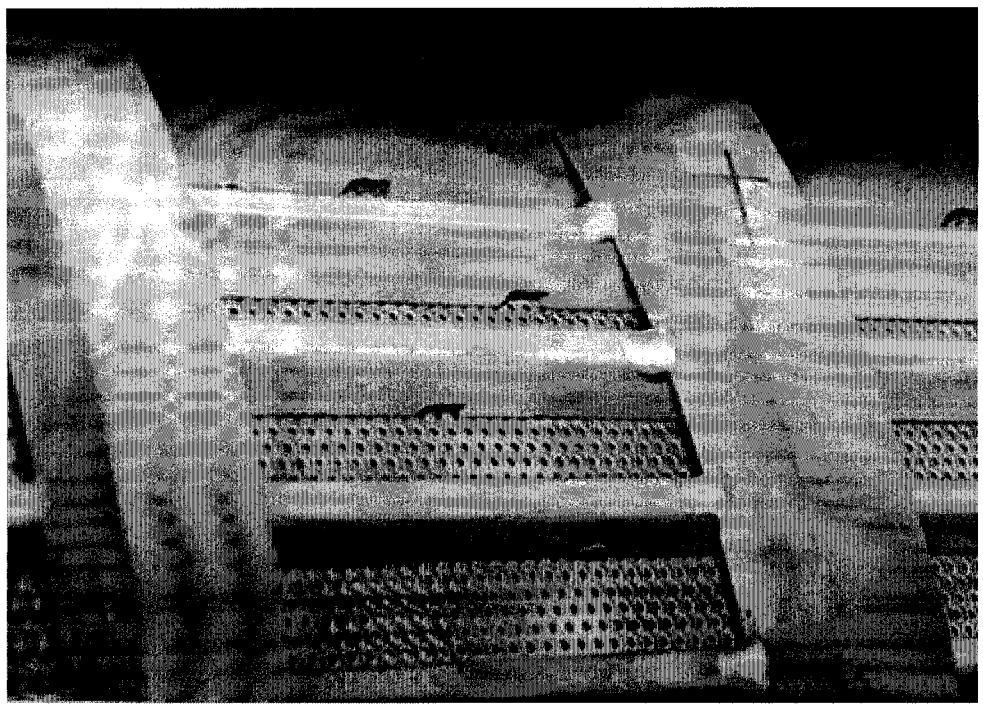
FIG. 8 is a partial perspective view of a liquid separating drum according to the prior art.
Figure 9:
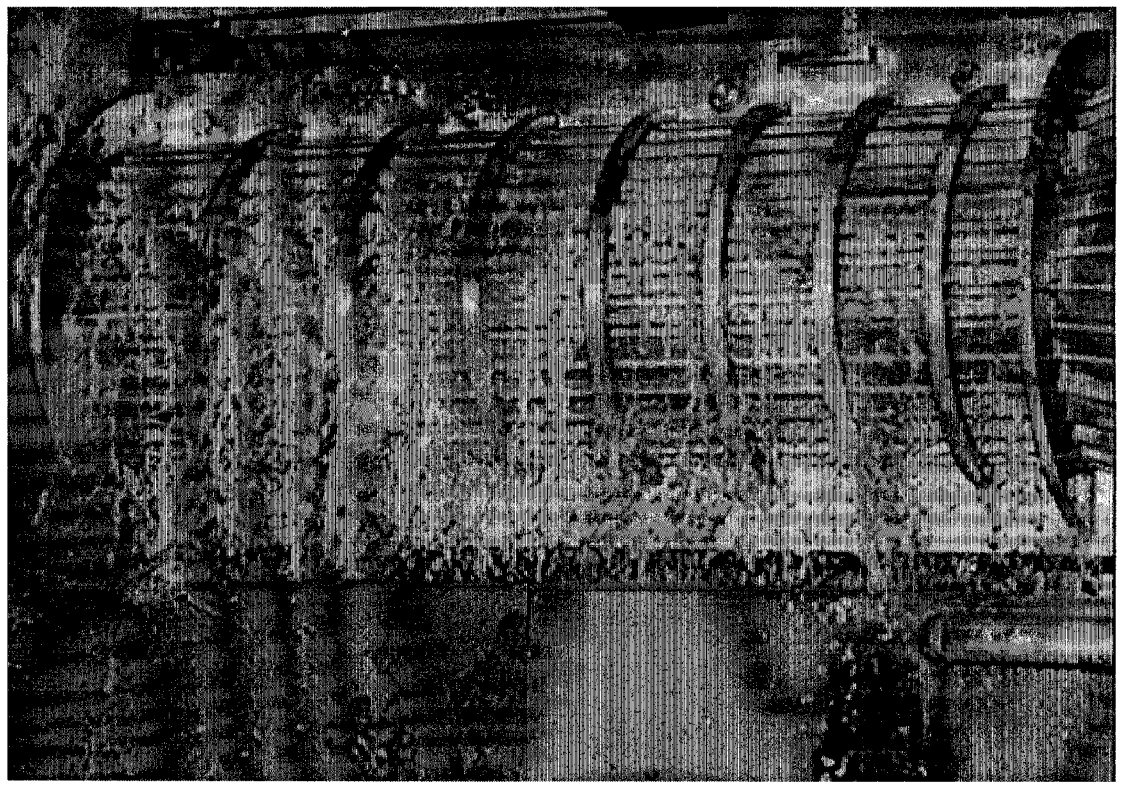
FIG. 9 is a partial perspective view of another liquid separating device according to the prior art, the liquid separating device being provided with a liquid separating drum similar to that of FIG. 8, and being shown in an operating configuration with liquid material coming out of perforated holes of its rotating liquid separating drum.
Figure 10:
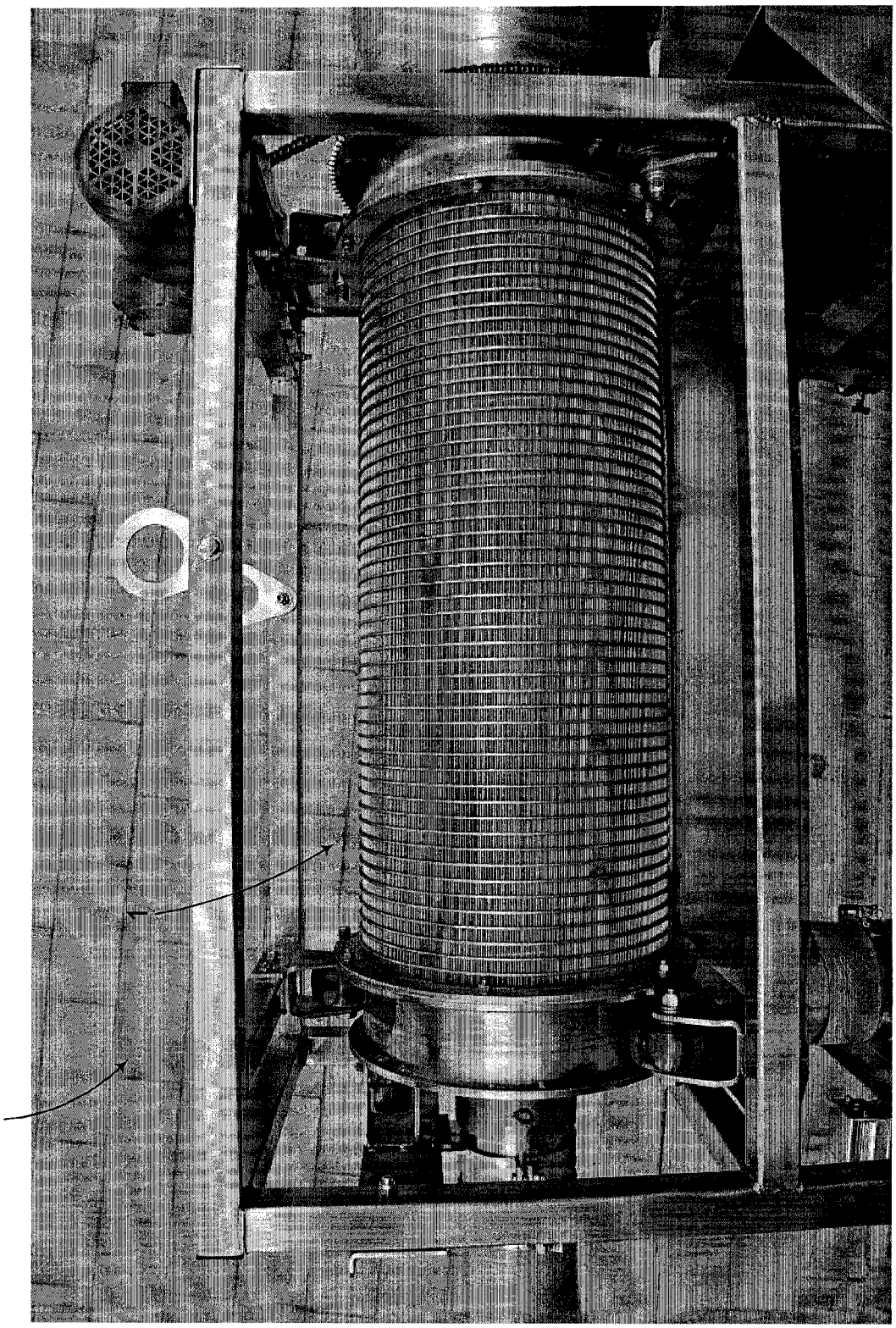
FIG. 10 is a side view of a separator provided with a liquid separating drum according to a preferred embodiment of the present invention.
Figure 11:
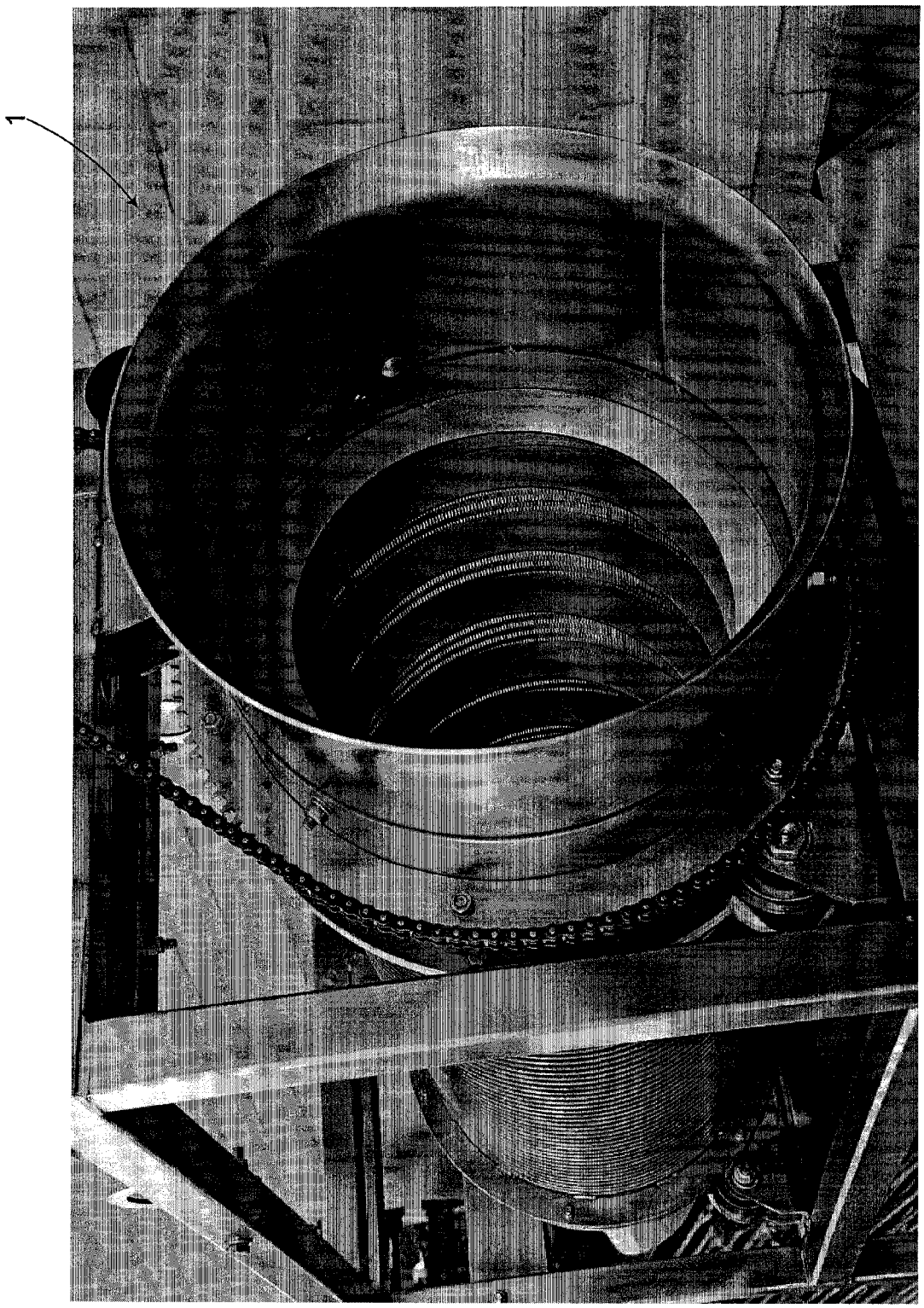
FIG. 11 is a partial end view of what is shown in FIG. 10.
Figure 12:
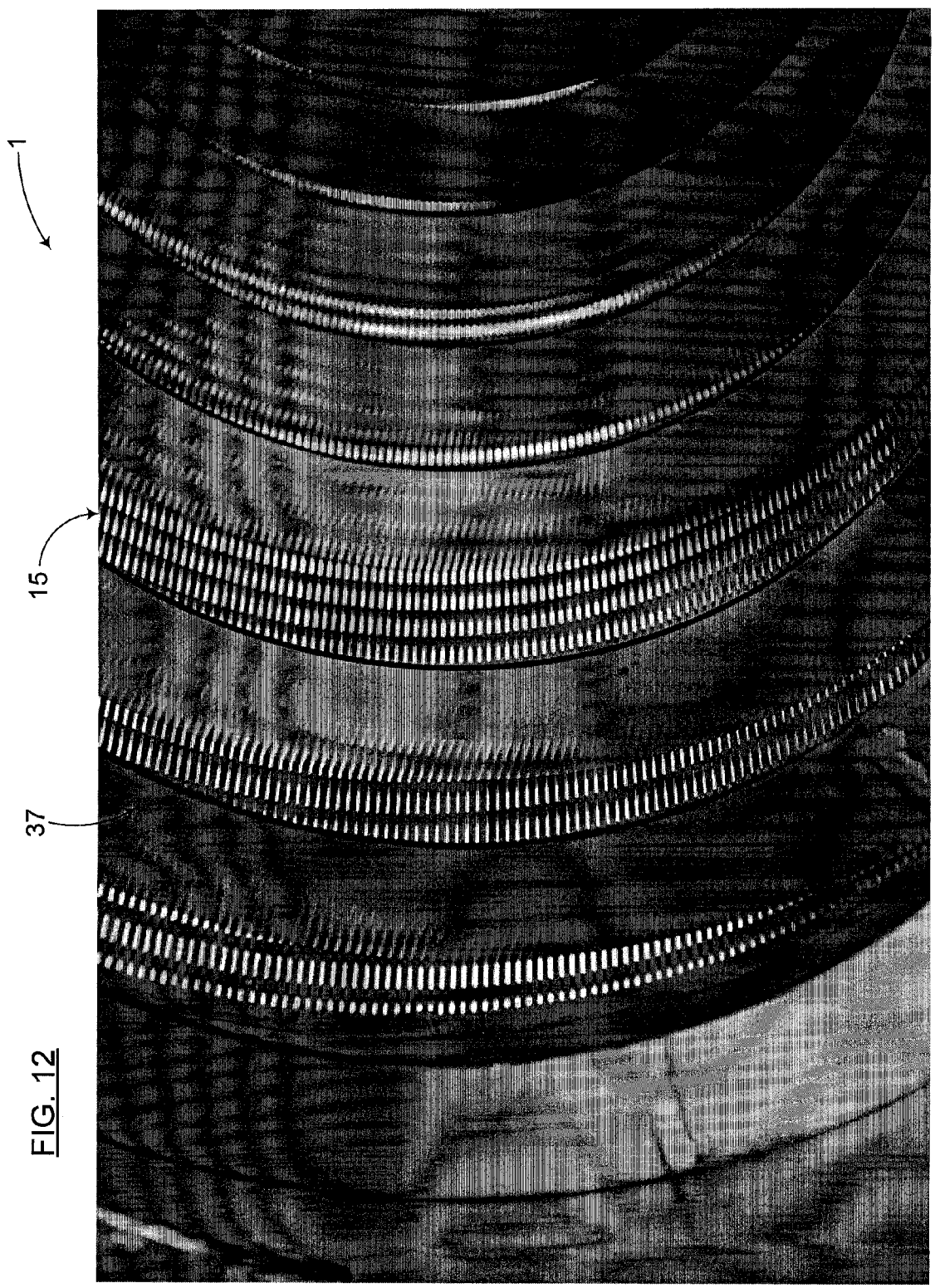
FIG. 12 is a partial perspective view of a portion of the inside of the liquid separating drum of FIG. 10, illustrating not only the supporting ribs and profiled bars of the drum, but also a section of the internal screw mechanism thereof, according to a preferred embodiment of the present invention.
Figure 13:
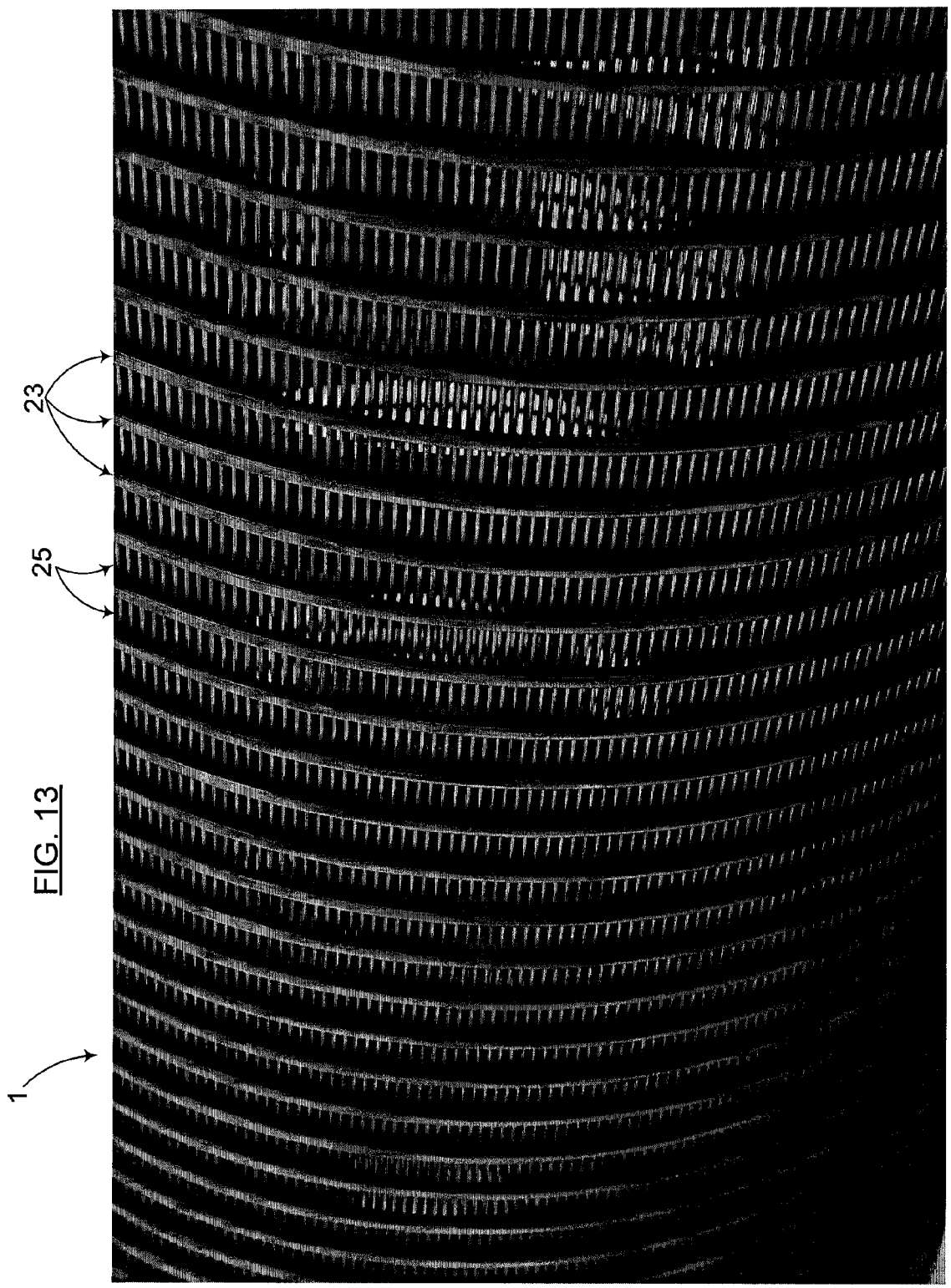
FIG. 13 is a partial perspective view of a portion of the outside of the liquid separating drum of FIG. 10, better illustrating its supporting ribs, and profiled bars mounted thereon, according to a preferred embodiment of the present invention.
Figure 14:
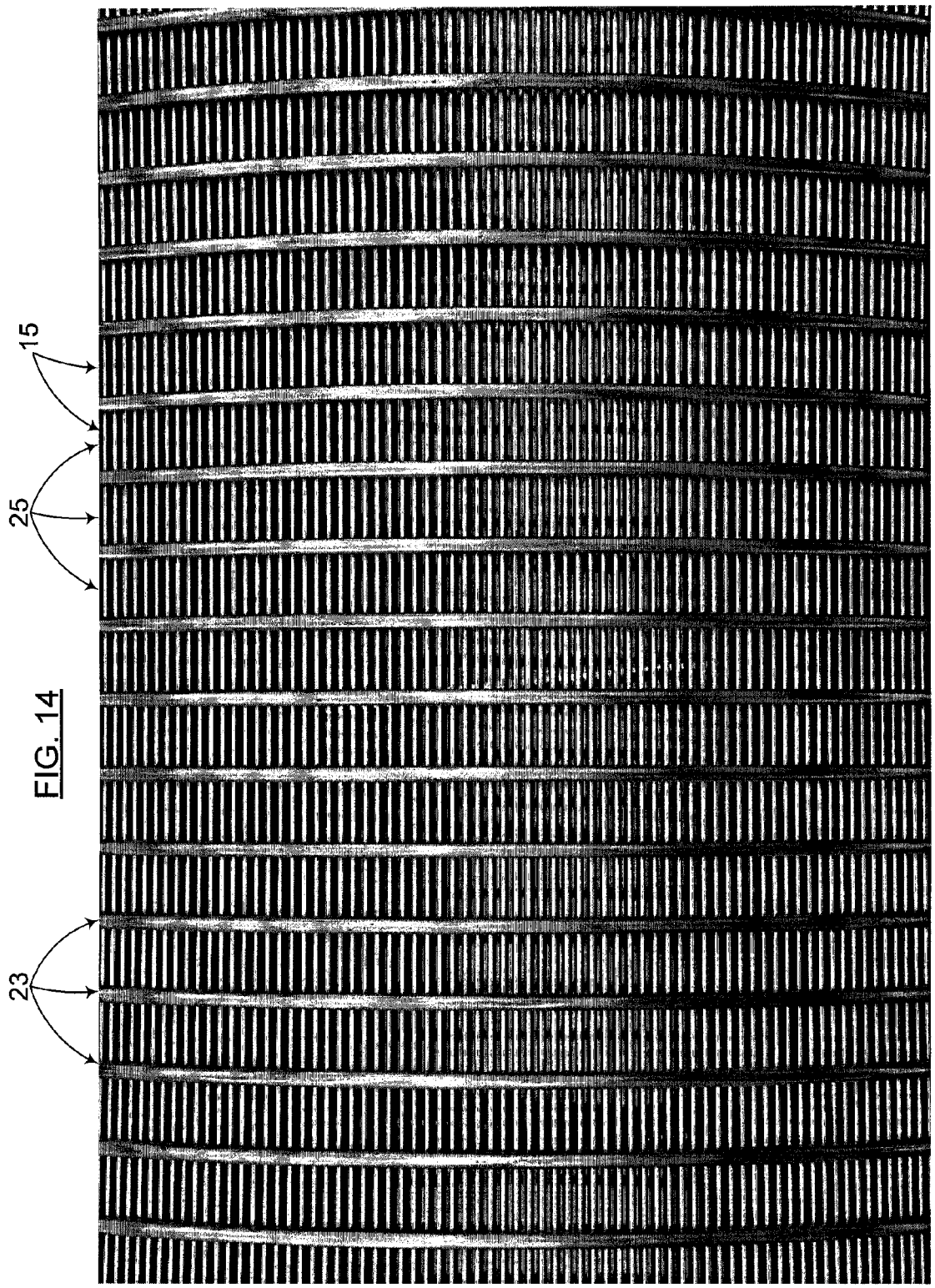
FIG. 14 is a side view of what is shown in FIG. 13.

While the invention will be described in conjunction with preferred embodiments given as way of mere examples, it is be understood that they are not intended to limit the scope of the present invention to such embodiments. On the contrary, it is intended to cover all possible alternatives, modifications and/or technical equivalents, with the present invention could be used and may be useful, as apparent to a person skilled in the art.

DETAILED DESCRIPTION OF PREFERRED EMBODIMENTS OF THE INVENTION

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed for use in the field of agriculture, farming and/or the like, for processing a mixture material typically containing at least some liquid material and at least some solid material, among other possible substances, such a manure and/or various other possible materials, the invention may be used with various other types of objects, and in various other fields, such as the construction field for example, for applications where liquid material, or at the very least a substantially "liquid" material, would have to be separated from a solid material, or at the very least from a substantially "non-liquid" material, as can be easily understood by a person skilled in the art. Hence, expressions such as "agriculture", "farming", "manure", "liquid", "solid", etc., as used in the present description, and/or any other reference and/or equivalent or similar expression to the latter should not be considered as limiting the scope of the present invention and include any other objects, substitutes, and/or any other applications with which the present invention may be used and may be useful, as can be easily understood by a person skilled in the art.

Moreover, in the context of the present description, expressions such as "separator", "drum", "liquid separating device", "system", "mechanism", "product", "device", "assembly", "cylinder", "screen" and "grid", as well as any other equivalent expressions and/or compounds word thereof known in the art will be used interchangeably, as apparent to a person skilled in the art. This applies also for any other mutually equivalent expressions, such as, for example: a) "processing", "treating", "handling", "extracting", "evacuating", "dewatering" and "liquid separating"; b) "slit", "slot", "orifice", "groove", "conduit", "port" and "channel"; c) "longitudinal", "oblong" and "elongated"; d) "interior", "inner" and "inside"; e) "exterior", "outer" and "outside"; f) "main body", "drum", "cylinder", "screen", "cage" and "grid"; g) "serrated", "teethed" and "segmented"; h) "material", "substance", "product", "manure", "matter" and "fibre"; i) "mixture", "composite" and "aggregate"; j) "profile" and "cross-section"; k) "supporting rib" and "arch"; l) "profiled bar" and "stringer"; m) "allow", "force", "draw" and "urge"; n) "diverging" and "expanding"; o) "converging" and "narrowing"; p) "side", "edge", "rim" and "border"; q) "water", "liquid" and "fluid"; r) "inlet" and "entry"; s) "outlet" and "exit"; etc.; as well as for any other mutually equivalent expressions, pertaining to the aforementioned expressions and/or to any other structural and/or functional aspects of the present invention, as also apparent to a person skilled in the art.

Furthermore, in the context of the present description, it will be considered that all elongated objects will have an implicit longitudinal axis, and that expressions such as "connected" and "connectable", or "mounted" and "mountable", may be interchangeable, in that the present invention also relates to a kit with corresponding components for assembling a resulting fully assembled liquid separating drum.

In addition, although the preferred embodiments of the present invention as illustrated in the accompanying drawings comprise various components, and although the preferred embodiments of the liquid separating drum, corresponding components and/or resulting separator of the present invention as shown consists of certain geometrical configurations as explained and illustrated herein, not all of these components and geometries are essential to the invention and thus should not be taken in their restrictive sense, i.e. should not be taken so as to limit the scope of the present invention. It is to be understood, as also apparent to a person skilled in the art, that other suitable components and cooperations thereinbetween, as well as other suitable geometrical configurations, may be used for the present liquid separating drum, corresponding components and/or resulting separator according to the present invention, as briefly explained herein and as can be easily inferred herefrom, without departing from the scope of the invention.

LIST OF NUMERICAL REFERENCES OF SOME OF THE CORRESPONDING PREFERRED COMPONENTS ILLUSTRATED IN THE ACCOMPANYING DRAWINGS 1. liquid separating drum (also referred to simply as "cylinder" or "screen")
3. separator
5. main body (of drum 1)
5a. inlet (of main body 5)
5b. outlet (of main body 5)
7. longitudinal axis (of main body 5)
9. base frame (of separator 3)
9a. longitudinal axis (of base frame 9)
11. mixture material to be processed
11a. liquid material (of mixture material 11)
11b. solid material (of mixture material 11)
15. longitudinal slit (of main body 5)
15a. inner opening (of slit 15)
15b. outer opening (of slit 15)
17. interior (of main body 5)
19. exterior (of main body 5)
21. interface
23. supporting rib (of drum 1) (also referred to simply as "arch")
23a. inner portion (of supporting rib 23)
23b. outer portion (of supporting rib 23)
25. profiled bar (of drum 1) (also referred to simply as "stringer")
25a. inner longitudinal side (of profiled bar 25)
25b. outer longitudinal side (of profiled bar 25)
25c. first longitudinal side (of profiled bar 25)
25d. second longitudinal side (of profiled bar 25)
27. symmetry axis (of profiled bar 25)
29. radial axis (of drum 1)
31. inner peripheral contact surface (of drum 1)
33. tumbling element (of main body 5)
35. rotating mechanism (of separator 3)
37. internal screw mechanism
39. recipient
41. collector at inlet (connection of the input)
43. primary section (of drum 1)
45. sealing joint
47. driving motor
49. rolling band
51. supporting wheel
53. driving sprocket wheel
55. drain of liquid material
$\theta_1$. slanted angle (between first longitudinal side 25c and corresponding inner longitudinal side 25a)
$\theta_2$. slanted angle (between second longitudinal side 25d and corresponding inner longitudinal side 25a)
$\Omega$. given angle (between symmetry axis 27 of profiled bar 25 and corresponding radial axis of drum 1)
$\beta_1$. inclination (between main body 5 of the drum 1 and base frame of the separator 30)

Figure 15:
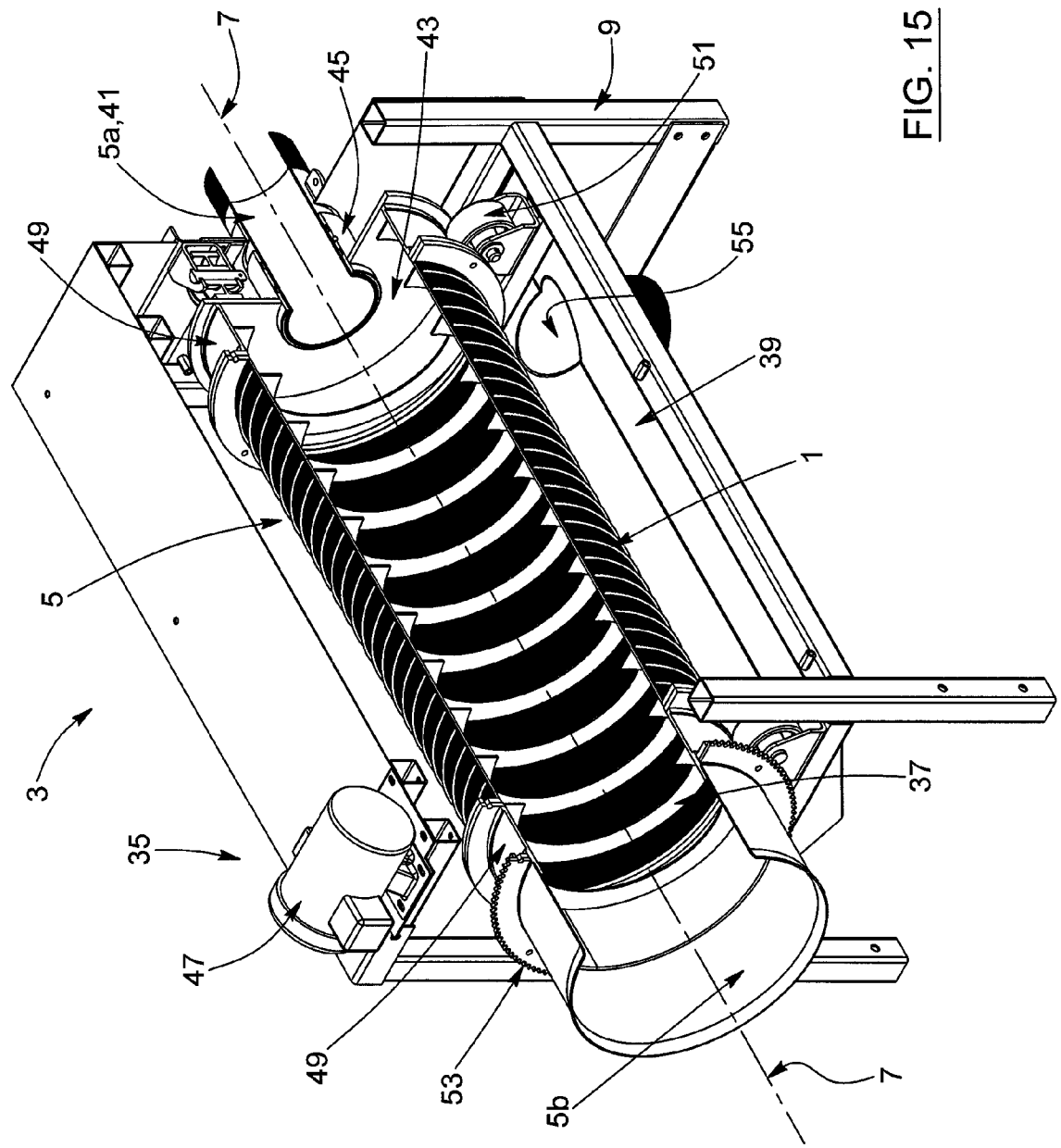
FIG. 15 is a perspective view of a separator according to a preferred embodiment of the present invention, a portion of the separator, including the liquid separating drum, being shown in a partial sectional view to better illustrate internal components thereof.
Figure 16:
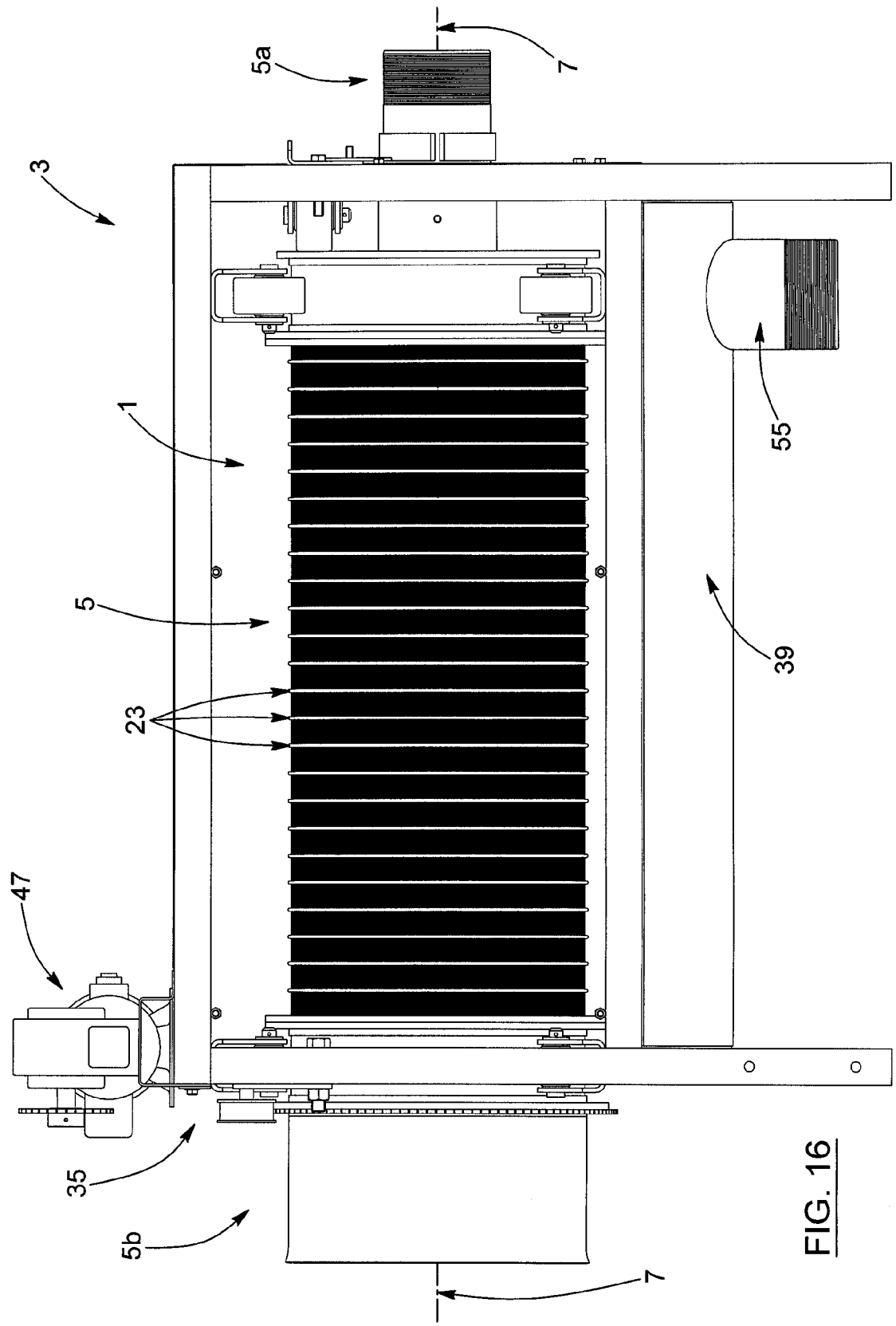
FIG. 16 is a side view of what is shown in FIG. 15.

Broadly described, the present invention, as exemplified in the accompanying drawings, relates to a liquid separating drum (1) for use with a separator (3) in order to separate liquid material (11a) from solid material (11b) in a mixture material (11) to be processed. As better shown in FIG. 15, the liquid separating drum (1) comprises an elongated main body (5) having a longitudinal axis (7), the main body (5) being removably mountable about a base frame (9) of the separator (3) so as to be rotatable with respect to said base frame (9), preferably about its longitudinal axis (7), the main body (5) having an inlet (5a) for receiving the mixture material (11) to be processed, and an outlet (5b) for releasing processed material.

A substantial improvement of the present invention over the prior art resides in the fact that, instead of having a liquid separating drum being perforated with small circular holes through which liquid material is allowed to escape, the present liquid separating drum (1) is provided with longitudinal slits (15). More particularly, and according to a preferred embodiment of the present invention, as better shown in FIGS. 12-14 and 17-20, the main body (5) comprises a plurality of longitudinal slits (15) operatively connecting the interior (17) of the main body (5) to the exterior (19) thereof, the longitudinal slits (15) extending longitudinally with respect to the main body (5) and being provided circumferentially about said main body (5), each longitudinal slit (15) being profiled and defining an interface (21) configured for allowing liquid material (11a) to evacuate out from the interior (17) of the main body (5) to the exterior (19) thereof, via the interface (21), in a diverging manner through the slit (15), while retaining solid material (11b) inside the main body (5).

This is particularly advantageous when used in an agricultural context, for treating liquid or semi-liquid manure, and/or other corresponding types of substances (black liquid, manure, etc.), for example, the main objective being the separation of the liquid material from the solid material. Hence, it is to be understood that the present invention may be used with a mixture material (11) where the initial state of the material to be treated may be variable, from very thick to very light (i.e. almost entirely liquid), and this matter to be treated may be generally composed of fecal matter, urine, water and litter in different forms (sand, vegetable fibers, sawdust, wood chips, etc.). There may also be the presence of milk and other substances resulting from other processes and/or activities taking place about the farm.

As will be briefly explained in greater detail hereinbelow, and as can be easily understood by a person skilled in the art in view of the present description and accompanying drawings, the present liquid separating drum (1) can constructed, manufactured and/or assembled in a variety of manners, depending on the applications for which the liquid separating drum (1) is intended for, the parameters being involved, and the desired end results. However, for sake of simplify, structural rigidity and cost effectiveness, for example, according to a preferred embodiment of the present invention, and as also better shown in FIGS. 12-14 and 17-20, the liquid separating drum (1) comprises a plurality of supporting ribs (23), and a plurality of profiled bars (25) mounted thereon, so as to form a screened or gridded cylindrical drum (1).

The plurality of supporting ribs (23) are preferably disposed along the longitudinal axis (7) of the main body (5) and extend transversally with respect to said longitudinal axis (5), as can be easily understood by a person skilled in the art when referring to FIGS. 13-20. As better shown in these figures, the plurality of profiled bars (25) are preferably mounted circumferentially onto the supporting ribs (23) and extend longitudinally with respect to the main body (5) so as to define complementary profiled longitudinal slits (15), each slit (15) being configured for allowing liquid material (11a) to evacuate out from the main body (5) through said slit (15), while retaining solid material (11b) inside the main body (5), as can be easily understood by a person skilled in the art when referring to FIGS. 17-20.

The particular embodiments, geometrical configurations and/or dimensions of the profiled bars (25) can be various, depending for which applications the liquid separating drum (1) is intended for, the mixture material (11) with which it is employed and to be processed, the desired end results, and other considerations, as apparent to a person skilled in the art.

Figure 17:
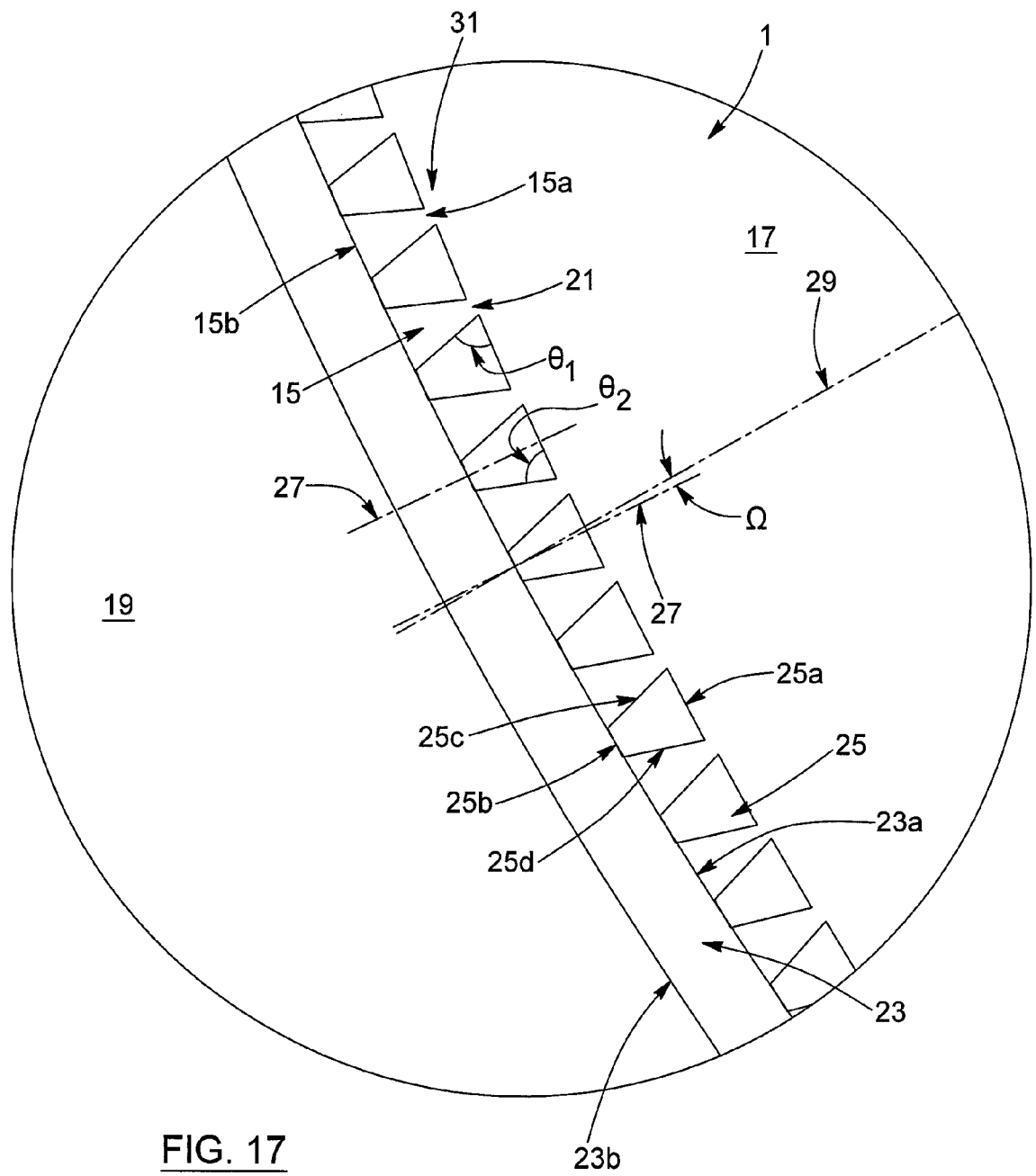
FIG. 17 is a partial cross-sectional view of a liquid separating drum according to a preferred embodiment of the present invention.
Figure 20:
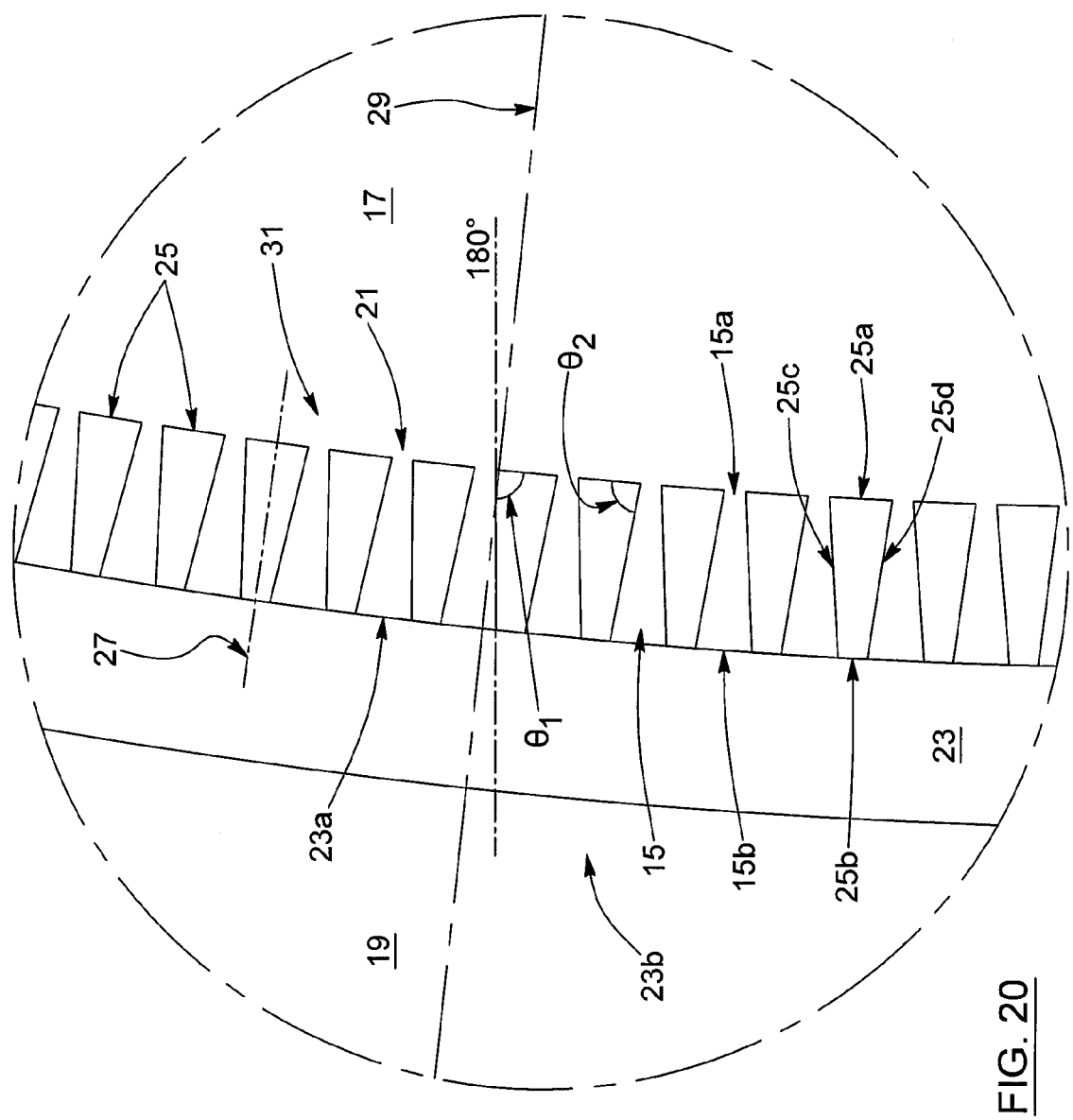
FIG. 20 is an enlarged view of a portion of what is shown in FIG. 19.

For example, and as better shown in FIGS. 17 and 20, each profiled bar (25) may comprises opposite inner and outer longitudinal sides (25a,25b), and first and second longitudinal sides (25c,25d) extending between the inner and outer longitudinal sides (25a,25b). Preferably also, the first and second longitudinal sides (25c,25d) of each profiled bar (25) may be each positioned at respective slanted angles ($\theta_1$, $\theta_2$) with respect to the inner and outer longitudinal sides (25a, 25b). According to the preferred embodiments shown in FIGS. 17 and 20, the first and second longitudinal sides (25c, 25d) are each positioned at mirror angles ($\theta$) with respect to each other, the mirror angle ($\theta$) of the embodiment of FIG. 20 being about 84 degrees. Obviously, other suitable angles ($\theta$) or ranges of angles ($\theta$) may be used, as apparent to a person skilled in the art, when contrasting FIGS. 17 and 20, for example.

However, in both case, and according to a preferred aspect of the present invention having been demonstrated to be particularly advantageous for treating manure and/or the like, each profiled bar (25) has a substantially trapezoidal profile, the inner longitudinal side (25a) being greater than the outer longitudinal side (25b), and the first and second longitudinal sides (25c,25d) converging from the inner longitudinal side (25a) towards the outer longitudinal side (25b). Even more preferably, each profiled bar (25) comprises a symmetry axis (27), and each profiled bar (25) is mounted onto supporting ribs (23) so that its symmetry axis (27) is disposed at a given angle ($\Omega$) with respect to a corresponding radial axis (29) of the liquid separating drum (1), as better illustrated in FIG. 17. When processing manure and/or the like, the given angle ($\Omega$) preferably ranges between about 2 degrees and about 4 degrees, but according to a preferred embodiment of the present invention, the given angle ($\Omega$) is about 3 degrees. This particular configuration provides substantial advantages over the prior art, as will be explained in greater detail hereinbelow.

Preferably also, and as better shown in FIGS. 17 and 20, each slit (15) comprises an inner opening (15a) and an outer opening (15b), the inner opening (15a) being defined between a pair of inner longitudinal sides (25a) of neighbouring profiled bars (25), and the outer opening (15b) being defined between a pair of outer longitudinal sides (25b) of said neighbouring profiled bars (25). Preferably also, inner longitudinal sides (25a) of the profiled bars (25) are disposed with respect to one another so as to provide the interior (17) of the main body (5) with an inner peripheral contact surface (31) that is serrated (toothed, segmented, etc.). This particular configuration also provides substantial advantages over the prior art, as will be explained in greater detail hereinbelow.

According to the preferred embodiments exemplified in the accompanying drawings, the profiled bars (25) are mounted circumferentially about an inner portion (23a) of the supporting ribs (23), as better shown in FIGS. 17 and 20, for example, however, the profiled bars (25) could alternatively be mounted circumferentially about an outer portion (25b) of the supporting ribs (23). Even more alternatively, segments of profiled bars (25) could ultimately extend between neighbouring supporting ribs (23), although the construction of such a configuration may require additional work.

It is worth mentioning also that the presence of profiled bars (25) mounted onto or between supporting ribs (23) is a mere example of a possible manner in which to define longitudinal slits (15) about the liquid separating drum (1), but that alternatively, the present liquid separating drum (1) could be constructed, manufactured and/or assembled otherwise in order to still be provided with such longitudinal slits (15), as a apparent to a person skilled art. For example, instead of having "separate" components, such supporting ribs (23) and profiled bars (25), these could be made integral to the same main body (5), which could be made of a single piece and/or a single material, via an appropriate manufacturing process, such as machining or moulding, for example. Moreover, it can be easily understood that the longitudinal slits (15) need not extend through the entire length of the main body (5), but rather at least along appropriate segments thereof, for carrying a suitable dewatering or liquid separation (extraction, evacuation, etc.), as also apparent to a person skilled in the art.

Irrespectively of how the longitudinal slits (15) are defined about the main body (5) of the drum (1), whether by means of separate components (e.g. combination of profiled bars (25) mounted about supporting ribs (23), or any other cage-like configuration), or whether the longitudinal slits (15) are made integrally to the main body (5) of the drum (1), the outer opening (15b) of each slit (15) is preferably greater than its corresponding inner opening (15a), and preferably also, each slit (15) divergently widens (expands, enlarges, etc.) from its inner opening (15a) to its outer opening (15b), as better shown in FIGS. 17 and 20. This particular configuration also provides substantial advantages over the prior art, as will be explained in greater detail hereinbelow. Namely, a practical example will be given where the longitudinal slits (15) of the drum (1) are positioned, shaped and sized about the main body (5) in such a manner that for a main body (5) having about 16 inches in diameter, and about 37 inches length, a given material can be processed by the liquid separating drum (1) at a rate of about 40 gallons per minute, something that is not possible with a conventional liquid separating drum with the same dimensions.

As will also be explained in greater detail hereinbelow, the interior (17) of the main body (5) is provided with a tumbling element (33) for tumbling material contained inside the main body (5). Preferably, the tumbling element (33) is a tumbling blade extending longitudinally with respect to the main body (5) of the liquid separating drum (1).

According to another aspect of the present invention, there is also provided a separator (3) for separating liquid material (11a) from solid material (11b) in a mixture material (11) to be processed. The separator (3) comprises a base frame (9); a liquid separating drum (1) according to the present invention, the drum (1) being rotatably mounted onto the base frame (9); and a rotating mechanism (35) operatively connected between the base frame (9) and the drum (1) for rotating said drum (1) with respect to the base frame (9) in order to allow liquid material (11a) to evacuate out from the drum (1) via longitudinal slits (15) thereof.

Figure 18:
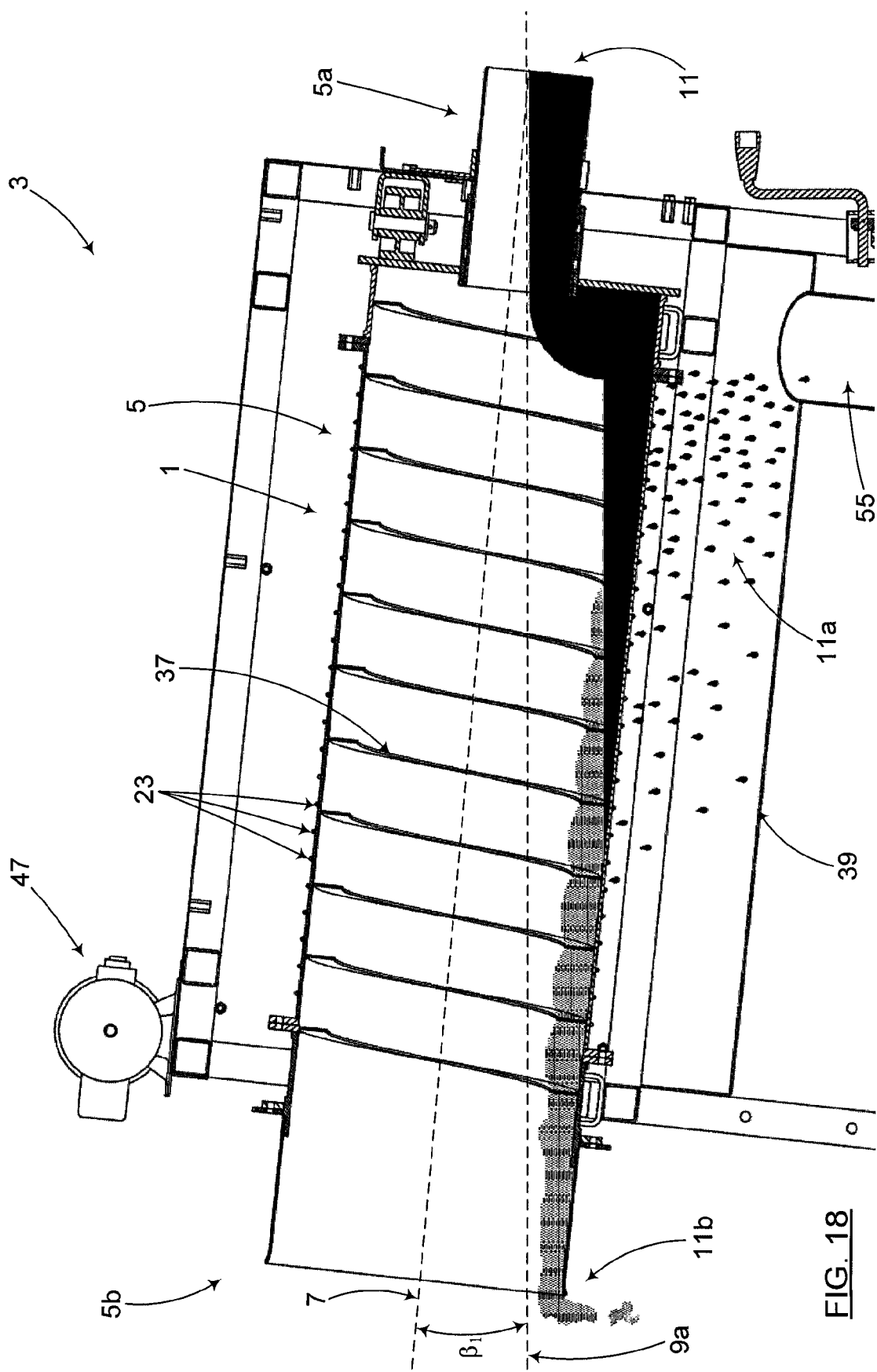
FIG. 18 is a longitudinal cross-sectional view of a separator according to another preferred embodiment of the present invention.
Figure 19:
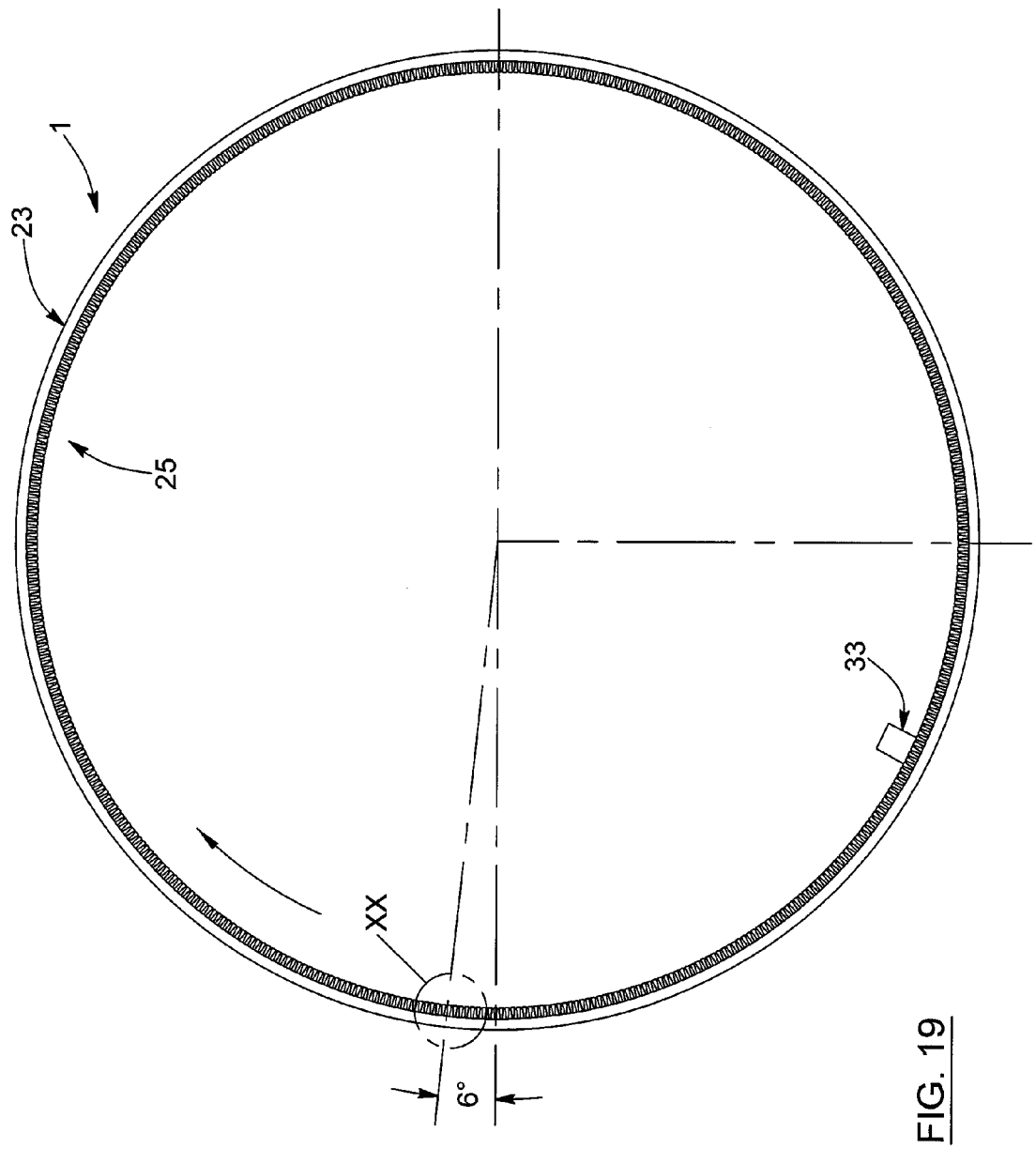
FIG. 19 is a cross-sectional view of a liquid separating drum according to another preferred embodiment of the present invention.

Preferably, and as better shown in FIG. 18, the main body (5) of the drum (1) can be disposed at a positive angle ($\beta_1$) with respect to the base frame (9), by means of an appropriate arrangement "mechanism", so that the outlet (5b) of the main body (5) be located higher than the inlet (5a) thereof. This particular configuration provides advantages, as will be explained in greater detail hereinbelow. As also shown, the separator (3) is preferably provided with an internal screw mechanism (37) located inside the drum (1) for urging solid material (11b) from the inlet (5a) of the main body (5) towards the outlet (5b) thereof. Preferably, the separator (3) comprises a recipient (39) placed about the drum (1) for recovering liquid material evacuated from said drum (1), the recipient (39) being preferably placed under the drum (1), and provided with a suitable drain (55).

According to another aspect of the present invention, there is also provided a kit with corresponding components for assembling the above-mentioned liquid separating drum (1) and/or separator (3), and the present system may also include a set of components for interchanging with certain components of the above-mentioned kit.

Following will be a brief description of how the liquid separating drum (1) and corresponding separator (3) work according to a preferred operational method of the present invention, as well as an overview of their various components and features, and resulting advantages. Indeed, the mixture material (11) or matter to be treated enters from the collector (1). The matter is then placed in the primary section (43) of the drum (1) (i.e. "upstream"). A rotatable joint preferably links the rotatable drum (1) at the connection of the inlet (5a). The rotation of the drum (1) is preferably ensured by a driving motor (47), such as an electric motor, for example. The drum (1) is preferably supported by two rolling bands (49), one positioned "upstream" and another one provided "downstream" of the drum (1). These rolling bands (49) are preferably guided by supporting wheels (51) along each of the planes restraining their movement. The driving of the drum (1) by the motor (47) can be provided by a sprocket fixed on the drum (1). The main body (5) of the drum (1) is preferably composed of trapezoidal profiled bars (25) or "stringers", which are supported by supporting ribs (23) or "arches". The longitudinal movement of the matter inside the drum (1) is controlled by an internal screw mechanism (37) which drives the displacement of the matter towards the end of the drum (1). Accumulation of matter in the drum (1) is possible by the positive inclination ($\beta_1$) of the drum (1). While the matter turns in the rotatable drum (1), the liquid material (11a) passes through the longitudinal slits (15) of the screen drum (1) due to gravity and/or centrifugal force. Given that the system is configured so that the solid material (11b) is too imposing to go through the longitudinal slits (15), it remains inside the drum (1) until it reaches the outlet (5b) downstream. However, the liquid material (11a) which is evacuated through the longitudinal slits (15) via a rotation of the drum (1) is recovered by the external recipient (39) of the separator (3). The solid material (11b) is pushed in the direction of the outlet (5b) by way of the internal screw mechanism (37). The motor driving elements, the support wheels of the drum, as well as the entry connection, are preferably operatively connected to the base frame (9) of the separator (3).

Tumbling elements (33) or "blades" installed longitudinally within the drum (1) produce a tumbling and turbulence effect in the mixture material (11) to be treated as the drum (1) rotates, promoting the loosening of the fibers, thereby contributing to preventing the obstruction of the longitudinal slits (15) of the liquid separating drum (1). This tumbling also increases the efficiency of the separation and the extraction of liquid material (11a) from the drum (1), by constantly renewing the humid matter to be treated, being in direct contact with the liquid separating drum (1).

As previously mentioned, the cross-section of each profiled bar (25) is preferably of a trapezoidal shape, and each profiled bar (25) is preferably mounted at an angle ($\Omega$) with respect to the vertical plane of the corresponding arch on which it is mounted, this angle ($\Omega$) being of approximately 3 degrees. This preferred 3-degree angle ($\Omega$) of the stringers (25), as better shown in FIG. 17, renders the liquid separating drum (1) much more aggressive in the gripping of the fibre in order to drive it into rotation along a longer distance, thus increasing the effective screening surface of the liquid separating drum (1).

The angle ($\Omega$) of the stringers (25) makes the inner peripheral contact surface (31) of the drum (1) less smoother, as is the case with conventional liquid separating drums, but rather variable (i.e. serrated, segmented, etc.), causing a further movement and turbulence effect in the mixture material (11) to be processed, which allows for the liquid material (11a) to be more efficiently released from the drum (1). Otherwise, as with conventional separators and their smooth inner peripheral contact surface, the stagnant mixture material (e.g. fibre, etc.) inside the drum could potentially obstruct orifices preventing the evacuation of the liquid material.

The choice of the 3-degree angle ($\Omega$) has been found to be optimal based on extensive experimentation and other research carried out by the Applicant given that: a) a nil or negative angle results in efficiency levels comparable to those obtained by the systems of the prior art; and b) a 5-degree angle ($\Omega$) of the stringers (25) or more renders the drum (1) too aggressive, leading to a potential rapid obstruction, and an increase in the solid particles contained in the liquid extract. Furthermore, it is worth mentioning also that error tolerances of screen suppliers for the angle ($\Omega$) of the stringers (25) is generally of about +/−1 degree. Thus, the 3-degree nominal angle ($\Omega$) allows to maintain a real and acceptable angle ($\Omega$) of the stringers (25) of the drum (1) which ranges between about 2 degrees and about 4 degrees.

As also mentioned earlier, the angle (8) of the first and second longitudinal sides (25c, 25d) of the profiled bars (25) is of about 6 degrees, with respect to their corresponding inner longitudinal side (25a), of corresponding outer longitudinal side (25b) which is meant to be preferably parallel. As can be easily understood by a person skilled in the art when referring to FIGS. 19 and 20, this angle (θ) is particularly advantageous in that, among other things, it maintains the evacuation capacity of the extracted liquid material over 8 stringers more during the rotation lift, in comparison to what would be possible with square stringers.

As can also be better appreciated by a person skilled in the art, the trapezoidal shape of the stringers (25) is also particularly advantageous in that once a drop of liquid material (11a) is engaged between two stringers (25), the distancing between the sides of the stringers (25) increases (2×6 degrees of angle), allows a better evacuation of the liquid. Indeed, instead of having the surface tension of the liquid have the effect of retaining drops between parallel sides of neighbouring stringers, the gradual distancing of the sides of the stringers (25) of the screen, according to a preferred embodiment of the present invention, reduces the effect of this phenomenon by allowing liquid material (11a) to be evacuated to reach a distance within the diverging slit (15) which is sufficient for the extracted drop to be released, since the surface tension is no longer sufficient to maintain the drop in suspension.

It is understood that the use of trapezoidal-shaped profiled bars (25) for the stringers is preferential and that the use of other types of suitable components having various other different geometrical profiles, such as, for example, triangular, semi-circular, flat, square, etc., for forming the stringers (25) and which would achieve the same or similar objectives, is considered as forming part of the scope of the present invention.

It is understood also that the use of the longitudinal stringers (25) placed along an axis which is substantially parallel to the longitudinal axis (7) of the drum (1) of the separator (3) is also preferable, but that any other suitable cooperation of the stringers (25) assembled onto the circular arches, or any other suitable supporting structure, is also encompassed as part of the scope of the present invention.

It is also understood that the assembly of the separator (3) described and illustrated herein may be modified. Namely, the screen with the stringers inside the cylinder and the arches on the exterior are preferential and may be inversed. For example, an assembly according to which the arches are on the inside is also encompassed in the present invention, as explained earlier.

In order to appreciate how the various components and features of the present liquid separating drum (1), as described and exemplified therein, make it a substantial improvement over the prior art, a practical example is given where for treating 40 gallons per minute (GPM) (about 151.4 liters per minute) of material using the best conventional device known in the art to the Applicant, the rotary screen of this conventional device requires to be 36" (91.44 cm) in diameter by 96" (243.84 cm) in length. However, the dimensions of the rotatable screen (1) according to the present invention for treating this very same 40 GPM (about 151.4 liters per minute) of material is of about 16"×37" (40.64 cm×93.98 cm), which shows the considerable increase in performance, for a much smaller drum. Indeed, the drum (1) of the present invention according to this practical example requires a screen surface of about 5.8 times smaller for accomplishing the same work than what would be required by the best known conventional drum to the Applicant. This considerable increase of performance is only possible with the components and features of the present invention which allow to have much smaller drums, which in turn represents considerable advantages to potential users thereof (lower costs, less space required, less energy required, etc.).

Moreover, as can be understood by a person skilled in the art, different possible variations may be brought to the present system, as described hereinabove, and as exemplified in the enclosed drawings, without necessarily departing from the scope of the present invention. For example, the usage of a longitudinal tumbling blade such as the one described herein is only preferential and any other suitably shaped or positioned tumbling component (33) is considered as forming part of the present invention. Moreover, one or more of the following parameters may be modified, depending on the applications for the liquid separating drum (1) and resulting separator (3) according to the present invention are intended for, and the desired end results, as apparent to a person skilled in the art, such as, for example: different spacing of the stringers (25) of the screen (1); different types of materials composing the stringers (25) and the arches (23) of the screen (1); different angles (θ, Ω, β) of operation of the rotatable screen (1); different speeds of rotation of the screen (1); different shapes and pitches of the internal screw mechanism (37); diameter of the screen (1); length of the screen (1); number of flights of the internal screw mechanism (37); driving method; method of supporting the screen (1) (e.g. rolling); and the placement of the driving system (motor, sprocket, etc.) and/or other components.

It is also worth mentioning that several other modifications may also be brought to the present system, as can also be easily understood by a person skilled in the art. For example, it is possible by adding different components to modify the manner in which the matter is passed through the cylinder. Optionally, it would also thus be possible to have a comb of a given form which would further improve the duration of the separation of the liquid. It would also be possible to drive the cylinder in a different manner or to support the cylinder by way of a different system. In the present case, the cylinder rests on wheels, which are driven by a sprocket wheel and a chain, as way of a mere possible example. Moreover, the attacking angle of the cylinder in its entirety may also be changed to answer to different speeds of treatment, according to the necessary capacity, as can also be easily understood by a person skilled in the art.

When comparing the present liquid separating drum (1) and corresponding resulting separator (3) with those of the prior art, it is worth mentioning that the latter all treat input matter and produce as an end result a less humid output, that is, an output having less liquid material. However, the conventional systems known tend to be more cumbersome, less efficient in terms of drying, more labor intensive in terms of maintenance, less versatile, more energy consuming, etc. In contrast, the system according to the present invention has the particularity and resulting advantage of being less bulky and cumbersome, while being more efficient and simple. Conventional screens with perforated openings (i.e. small simple straightforward circular holes) are very common, however, they do not provide the gripping feature and the superior water evacuation capability of the present invention.

In comparison to existing technologies known to the Applicant, the present invention, such as may now be better appreciated, is also particularly advantageous in that the design of the elements of separation, namely the screen (1) and its unique features, improve the separation rate. Preferably, and as aforementioned, the drum (1) has longitudinal slits (15) of trapezoidal shape forming the screen, and allows to limit the opening while facilitating the evacuation of the liquid. Preferably also, each of the profiled bars (25) is configured in a particular way, the spacing between the profiled bars (25) being chosen for optimizing the separation of the liquid material (11a). Moreover, the angle between the profiled bars (25) allows to grip the matter and accelerates the extraction of the liquid material.

Each of these described innovative features separates the matter by passing the input, and separates the solid from the liquid by forcing the liquid to pass through the longitudinal slits (15) with a narrow interface (21) and expanding profile, which the solid material (11*a*) is prevented from crossing. The current design of the present invention in particular, contributes to the passage of the water by having a more favorable shape to this passage, and being opened along the whole length of the screen (1), the separator (3) providing a larger percentage of "opened area" for liquid evacuation when compared to conventional small simple straightforward circular holes, while practically eliminating the evacuation of solid particles and without allowing the liquid to move between two openings. Furthermore, it may be better appreciated that according to the preferred embodiments of the present invention, as exemplified in the accompanying drawings, liquid material (11*a*) is allowed to evacuate quickly out from the drum (1) via the longitudinal slits (15) thereof, in a direct and uninterrupted radial manner, where once the liquid material (11*a*) has entered the given interface (21) of the longitudinal slit (15), it is allowed to expand through said diverging longitudinal slit (15).

Moreover, further to having orifices of different shapes and being continuous, the angle of each stringer (25) of the screen (1) has the particularity of increasing its capacity of gripping the matter and of allowing the matter to follow a longer trajectory in the cylinder (1), thus improving the duration of extraction of the liquid. The behavior of the matter in the cylinder (1) is also changed and improved, in turn providing an increased efficiency of liquid extraction. Namely, the material (11) swings in a continuous manner allowing to renew the material (11) to be treated being in direct contact with the filtration screen.

Several other advantages result from the system according to the present invention. For example, due to its innovative design, the drum (1) or cylinder (i.e. the "screen") grips the matter in order to allow it to travel more in the cylinder. The sudden acceleration force applied on the fibers being gripped contributes to the solid/liquid separation given that the liquid itself is not gripped and tends to resist to this force of kinetic energy. Moreover, the particular shape of the present cylinder (1) further allows a better breaking away of liquid by a progressive distancing between the stringers (25). The size of the internal screw mechanism (37) also allows to control the forward motion of the matter within the cylinder (1). As also previously explained, the present invention is also advantageous in that it allows to treat mixture material (11) efficiently, in a very restricted and limited space.

It is understood that the present invention, in terms of the screen technology for solid/liquid separation, may be used in different assemblies adapted to the needs of the present application and on different models of the Applicant's separators or other separators, such as for example: vertical dewaterers, sloped screen separators and roller press separators.

Finally, and according to the present invention, the liquid separating drum (1), resulting separator (3) and corresponding components are preferably made of substantially rigid materials, such as metallic materials (stainless steel, etc.), hardened polymers, composite materials, and/or any other adequate material, while other components of the system according to the present invention, with the object of obtaining the resulting advantages briefly discussed hereinabove, may be made of any other appropriate material, such as polymer materials (plastic, rubber, etc.), and/or any other suitable material, depending on the particular applications and the environment for which the system is designed, and the different parameters in play, as can be easily understood by a person skilled in the art.

The scope of the claims should not be limited by the preferred embodiments set forth in the examples, but should be given the broadest interpretation consistent with the description as a whole.

The invention claimed is:

1. A liquid separating drum (1) for use with a manure separator (3) in order to separate liquid material (11*a*) from solid material (11*b*) in a mixture material (11) of manure to be processed, the liquid separating drum (1) comprising:
an elongated main body (5) having a longitudinal axis (7), the main body (5) being removably mountable about a base frame (9) of the manure separator (3) so as to be rotatable with respect thereto, the main body (5) having an inlet (5*a*) for receiving the mixture material (11) of manure to be processed, and an outlet (5*b*) for releasing processed manure material, the main body (5) comprises a plurality of longitudinal slits (15) operatively connecting the interior (17) of the main body (5) to the exterior (19) thereof, the longitudinal slits (15) extending longitudinally with respect to the main body (5) and being provided circumferentially about said main body (5), each longitudinal slit (15) being profiled and defining an interface (21) configured for allowing liquid material (11*a*) to evacuate out from the interior (17) of the main body (5) via the interface (21) in a diverging manner through the slit (15), while retaining solid material (11*b*) inside the main body (5);
a plurality of supporting ribs (23) disposed along the longitudinal axis (7) of the main body (5) and extending transversally with respect to said longitudinal axis (7); and
a plurality of profiled bars (25) mounted circumferentially onto the supporting ribs (23) and extending longitudinally with respect to the main body (5) so as to define complementary profiled longitudinal slits (15), each slit (15) being configured for allowing liquid material (11*a*) of the manure to be processed to evacuate out from the main body (5) through said slit (15), while retaining solid material (11*b*) of the manure to be processed inside the main body (5), each profiled bar (25) comprising a central axis (27), and each profiled bar (25) being mounted onto supporting ribs (23) so that its central axis (27) is disposed at a given angle ($\Omega$) ranging with respect to a corresponding radial axis (29) of the liquid separating drum (1), the given angle ($\Omega$) ranging between about 2 degrees and about 4 degrees so as to provide the main body (5) with an inner peripheral contact surface (31) that is serrated, and the main body (5) of the drum (1) being configured for mounting at a positive inclination ($\beta_1$) with respect to a longitudinal axis (9*a*) of the base frame (9), so that the outlet (5*b*) of the main body (5) be located higher than the inlet (5*a*) thereof.

2. A liquid separating drum (1) according to claim 1, wherein each profiled bar (25) comprises opposite inner and outer longitudinal sides (25*a*,25*b*), and first and second longitudinal sides (25*c*,25*d*) extending between the inner and outer longitudinal sides (25*a*,25*b*).

3. A liquid separating drum (1) according to claim 2, wherein the first and second longitudinal sides (25*c*,25*d*) are each positioned at respective slanted angles ($\theta_1$, $\theta_2$) with respect to the inner and outer longitudinal sides (25*a*,25*b*).

4. A liquid separating drum (1) according to claim 2, wherein the first and second longitudinal sides (25*c*,25*d*) are each positioned at mirror angles ($\theta$) with respect to each other.

5. A liquid separating drum (1) according to claim 4, wherein the mirror angles (θ) are about 84 degrees each.

6. A liquid separating drum (1) according to claim 2, wherein each profiled bar (25) has a substantially trapezoidal profile, the inner longitudinal side (25a) being greater than the outer longitudinal side (25b), and the first and second longitudinal sides (25c,25d) converging from the inner longitudinal side (25a) towards the outer longitudinal side (25b).

7. A liquid separating drum according to claim 1, wherein the given angle (Ω) is about 3 degrees.

8. A liquid separating drum (1) according to claim 1, wherein each slit (15) comprises an inner opening (15a) and an outer opening (15b), the inner opening (15a) being defined between a pair of inner longitudinal sides (25a) of neighbouring profiled bars (25), and the outer opening (15b) being defined between a pair of outer longitudinal sides (25b) of said neighbouring profiled bars (25).

9. A liquid separating drum (1) according to claim 8, wherein the outer opening (15b) of each slit (15) is greater than its corresponding inner opening (15a).

10. A liquid separating drum (1) according to claim 8, wherein each slit (15) divergently widens from its inner opening (15a) to its outer opening (15b).

11. A liquid separating drum (1) according to claim 1, wherein inner longitudinal sides (25a) of the profiled bars (25) are disposed with respect to one another so as to provide the interior (17) of the main body (5) with an inner peripheral contact surface (31) that is serrated.

12. A liquid separating drum (1) according to claim 1, wherein the profiled bars (25) are mounted circumferentially about an inner portion (23a) of the supporting ribs (23).

13. A liquid separating drum (1) according to claim 1, wherein the profiled bars (25) are mounted circumferentially about an outer portion (25b) of the supporting ribs (23).

14. A liquid separating drum (1) according to claim 1, wherein the interior (17) of the main body (5) is provided with a tumbling element (33) for tumbling material contained inside the main body (5).

15. A liquid separating drum (1) according to claim 14, wherein the tumbling element (33) is a tumbling blade extending longitudinally with respect to the main body (5) of the liquid separating drum (1).

16. A manure separator (3) for separating liquid material (11a) from solid material (11b) in a mixture material (11) of manure to be processed, the separator (3) comprising:

a base frame (9);
a liquid separating drum (1) according to claim 1, the drum (1) being rotably mounted onto the base frame (9); and
a rotating mechanism (35) operatively connected between the base frame (9) and the drum (1) for rotating said drum (1) with respect to the base frame (9) in order to allow liquid material (11a) of the manure to evacuate out from the drum (1) via longitudinal slits (15) thereof.

17. A manure separator (3) according to claim 16, wherein the main body (5) of the drum (1) is disposed at a positive inclination ($\beta_1$) with respect to a longitudinal axis (9a) of the base frame (9), the outlet (5b) of the main body (5) being located higher than the inlet (5a) thereof.

18. A manure separator (3) according to claim 16, wherein the manure separator (3) is provided with an internal screw mechanism (37) located inside the drum (1) for urging solid material (11b) from the inlet (5a) of the main body (5) towards the outlet (5b) thereof.

19. A manure separator (3) according to claim 16, wherein the manure separator (3) comprises a recipient (39) placed about the drum (1) for recovering liquid material evacuated from said drum (1).

20. A manure separator (3) according to claim 19, wherein the recipient (39) is placed under the drum (1).

21. A kit for assembling a manure separator (3) intended for separating liquid material (11a) from solid material (11b) in a mixture material (11) of manure to be processed, the kit comprising:

a base frame (9);
a liquid separating drum (1) according to claim 1, the drum (1) being rotably mountable onto the base frame (9); and
a rotating mechanism (35) operatively connectable between the base frame (9) and the drum (1) for rotating said drum (1) with respect to the base frame (9) in order to allow liquid material (11a) of the manure to evacuate out from the drum (1) via longitudinal slits (15) thereof.

22. A kit according to claim 21, wherein the kit further comprises an internal screw mechanism (37) mountable inside the drum (1) for urging solid material (11b) from the inlet (5a) of the main body (5) towards the outlet (5b) thereof.

23. A kit according to claim 21, wherein the kit further comprises a recipient (39) placeable about the drum (1) for recovering liquid material (11a) evacuated from said drum (1).

* * * * *